US010789287B2

(12) United States Patent
Li et al.

(10) Patent No.: US 10,789,287 B2
(45) Date of Patent: Sep. 29, 2020

(54) METHOD AND SYSTEM FOR MULTI-DIMENSIONAL IMAGE MATCHING WITH CONTENT IN RESPONSE TO A SEARCH QUERY

(71) Applicant: Baidu USA LLC, Sunnyvale, CA (US)

(72) Inventors: Dong Li, Sunnyvale, CA (US); Yifei Jiang, Sunnyvale, CA (US); Fan Zhu, Sunnyvale, CA (US); Qi Kong, Sunnyvale, CA (US); Shuang Wu, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 772 days.

(21) Appl. No.: 15/202,514

(22) Filed: Jul. 5, 2016

(65) Prior Publication Data
US 2018/0011876 A1 Jan. 11, 2018

(51) Int. Cl.
*G06F 16/58* (2019.01)
*G06F 16/583* (2019.01)
*G06F 16/9535* (2019.01)
*G06F 16/2457* (2019.01)

(52) U.S. Cl.
CPC .... *G06F 16/5838* (2019.01); *G06F 16/24575* (2019.01); *G06F 16/9535* (2019.01)

(58) Field of Classification Search
CPC .................................................. G06F 16/5838

USPC ........................................................ 707/706
See application file for complete search history.

(56) References Cited

U.S. PATENT DOCUMENTS

| | | | | |
|---|---|---|---|---|
| 2007/0067345 | A1* | 3/2007 | Li ........................ | G06F 16/951 |
| 2013/0080426 | A1* | 3/2013 | Chen .................... | G06F 16/583 |
| | | | | 707/723 |
| 2014/0207789 | A1* | 7/2014 | Lee .................... | G06F 16/90324 |
| | | | | 707/741 |
| 2015/0066705 | A1* | 3/2015 | White ................... | G06F 16/951 |
| | | | | 705/26.62 |
| 2015/0161268 | A1* | 6/2015 | Dasher ................ | G06F 16/9535 |
| | | | | 707/728 |
| 2016/0070722 | A1* | 3/2016 | Heyward ............... | G06F 16/58 |
| | | | | 707/772 |
| 2016/0267535 | A1* | 9/2016 | Bhattacharjee ..... | G06F 16/9535 |

* cited by examiner

*Primary Examiner* — Syling Yen
(74) *Attorney, Agent, or Firm* — Womble Bond Dickinson (US) LLP

(57) ABSTRACT

According to one embodiment, in response to a search query received from a client, a search is performed in a content database to identify a list of one or more content items based on one or more keywords of the search query. A first search is performed in an image store to identify a first set of one or more images using a first image searching method. A second search is performed in the image store to identify a second set of one or more images using a second image searching method that is different than the first image searching method. A search result is transmitted to the client, the search result having at least a portion of the content items to the client. Each content item is associated with one of the images selected from the first set of images or the second set of images.

18 Claims, 11 Drawing Sheets

300

| Query Keyword(s) | Image Identifier(s) |
|---|---|
| Flower | Image 1, Image 2, Image 3, Image 4, Image 5 |
| Beijing Flower | Image 1 |
| Shanghai Flower | Image 2 |
| Flower Delivery | Image 1, Image 2, Image 4 |
| 301 ... | 302 ... |

FIG. 3A

| 340 | |
|---|---|
| Content Provider ID | Image ID(s) |
| ... | ... |
| ... | ... |

FIG. 3C

| 380 | |
|---|---|
| Content Distribution Locality ID | Image ID(s) |
| ... | ... |
| ... | ... |

FIG. 3E

| 320 | |
|---|---|
| Content ID | Image ID(s) |
| ... | ... |
| ... | ... |

FIG. 3B

| 360 | |
|---|---|
| Content Distribution Plan ID | Image ID(s) |
| ... | ... |
| ... | ... |

| Priority | Image Searching Method |
|---|---|
| 1 | Query-Based |
| 2 | Content-Based |
| 3 | Content Provider-Based |
| 4 | Content Distribution Plan-Based |
| 5 | Content Distribution Locality-Based |
| ... | ... |

FIG. 6

METHOD AND SYSTEM FOR MULTI-DIMENSIONAL IMAGE MATCHING WITH CONTENT IN RESPONSE TO A SEARCH QUERY

FIELD OF THE INVENTION

Embodiments of the present invention relate generally to searching content. More particularly, embodiments of the invention relate to searching content with multi-dimensional image matching in response to a search query.

BACKGROUND

Most search engines typically perform searching of Web pages during their operation from a browser running on a client device. A search engine receives a search term entered by a user and retrieves a search result list of Web pages associated with the search term. The search engine displays the search results as a series of subsets of a search list based on certain criteria. General criteria that is used during a search operation is whether the search term appears fully or partly on a given webpage, the number of times the search string appears in the search result, alphabetical order, etc. Further, the user can decide to open a link by clicking on the mouse button to open and browse. Some of the user interactions with the search results and/or user information may be monitored and collected by the search engine to provide better searches subsequently.

Typically, in response to a search query, a search is performed to identify and retrieve a list of content items. The content items are then returned to a search requester. A conventional search engine would return most of the content items as is without modifying. Some of the content items in the search result are just plain text or description, which may deem to be unattractive or boring. Sometimes content in a search result would be more presentable or attractive if the content items are prepared with certain images that are related to the content items. However, it is quite challenge to match appropriate images with content items. There has been a lack of efficient ways to match content with images and to evaluate the matching of content and images.

BRIEF DESCRIPTION OF THE DRAWINGS

Embodiments of the invention are illustrated by way of example and not limitation in the figures of the accompanying drawings in which like references indicate similar elements.

FIGS. 3A-3E are block diagrams illustrating certain index data structures for searching images according to certain embodiments of the invention.

FIG. 6 is a block diagram illustrating an example of a priority list for searching images according to one embodiment of the invention.

DETAILED DESCRIPTION

Figure 1A:
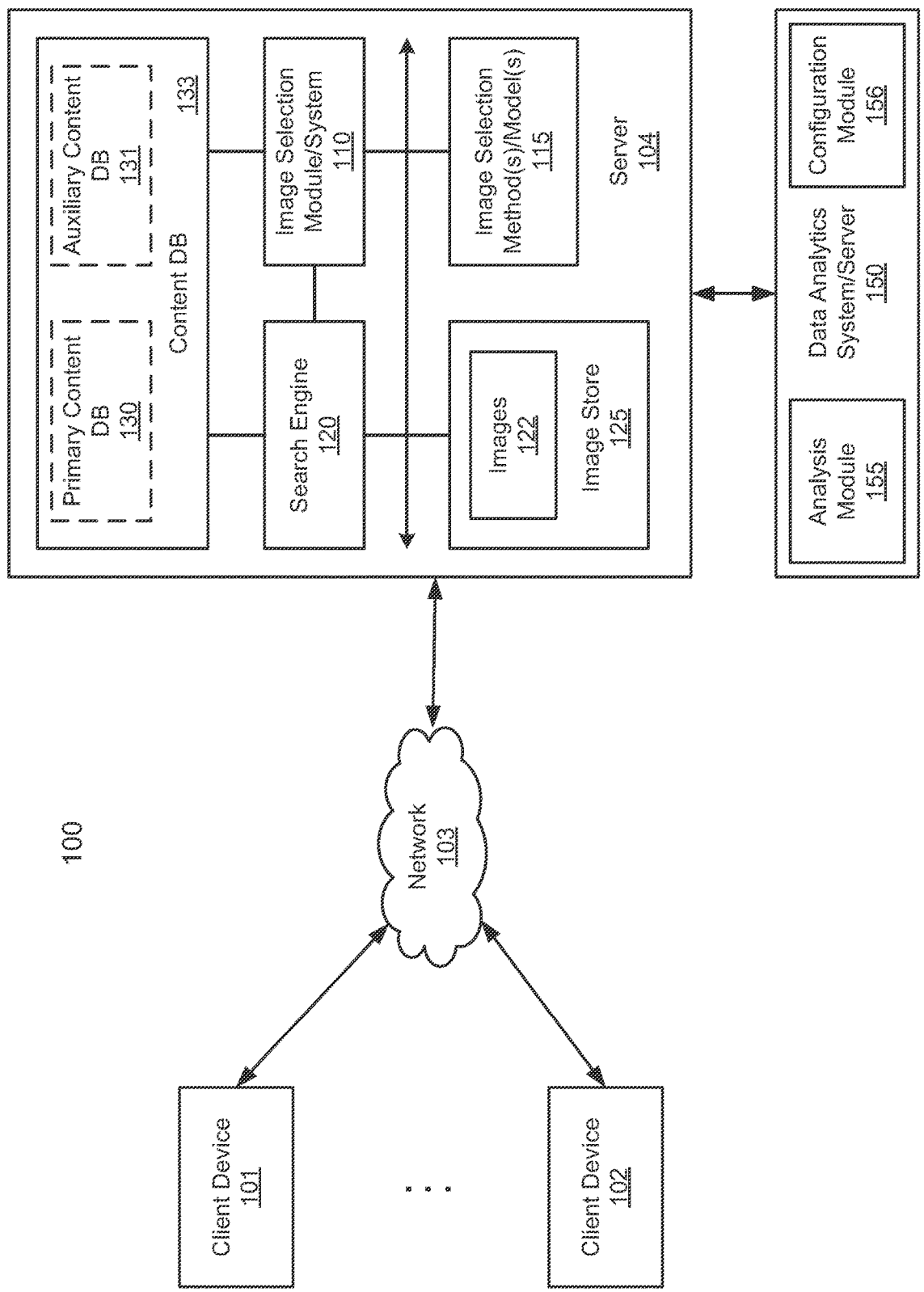
FIGS. 1A and 1B are block diagram illustrating an example of system configuration for matching images with content items according to some embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, multiple image searching methods are provided to search images based on different parameters or factors. In response to a search query received from a client, a search is performed in a content database or content server to identify a list of one or more content items based on one or more keywords of the search query. A first search is performed in an image store or image server to identify a first set of one or more images using a first image searching method. A second search is performed in the image store or image server to identify a second set of one or more images using a second image searching method that is different than the first image searching method. A search result is transmitted to the client, the search result having at least a portion of the content items listed therein. Each content item is associated with one of the images selected from the first set or the second set of images (e.g., as a background image).

In one embodiment, the image search methods may include a first image searching method to search images based on a search query (also referred to as a query-based searching method), a second image searching method to search images based on a content identifier (ID) identifying a particular content item (also referred to as a content-based image searching method), and a third image searching method to search images based on a content provider ID identifying a particular content provider that provides one or more content items (also referred to as a content provider based searching method). The image search methods may further include a fourth image searching method to search images based on a content distribution plan ID identifying a particular content distribution plan (also referred to as a content distribution plan based image search method) and a fifth image searching method to search images based on a content distribution locality ID identifying a locale associated with a particular content item or items (also referred to as a content distribution locality based image searching method). Other image searching methods may also be applied.

In one embodiment, the image searching methods may be configured in a priority list or priority configuration file according to a priority order. An image searching method having a higher priority may be selected and utilized before another image searching method having a lower priority is utilized. In one embodiment, if the images of the first set obtained from the first search using the first image searching method do not satisfy the requirement of the content items, the second search is then performed using a second image searching method, and so on. Otherwise, the second search may not be performed. The image searching methods listed in the priority list may be determined and ranked based on prior image searches and the user interactions (e.g., click rate, recall rate) with respect to the prior search results. An image searching method resulting in better matching quality (e.g., based on user interactions) may be configured with a higher priority. The priority order of the priority list may be periodically updated based on the analyses of the ongoing user interactions with various search results.

Figure 1B:
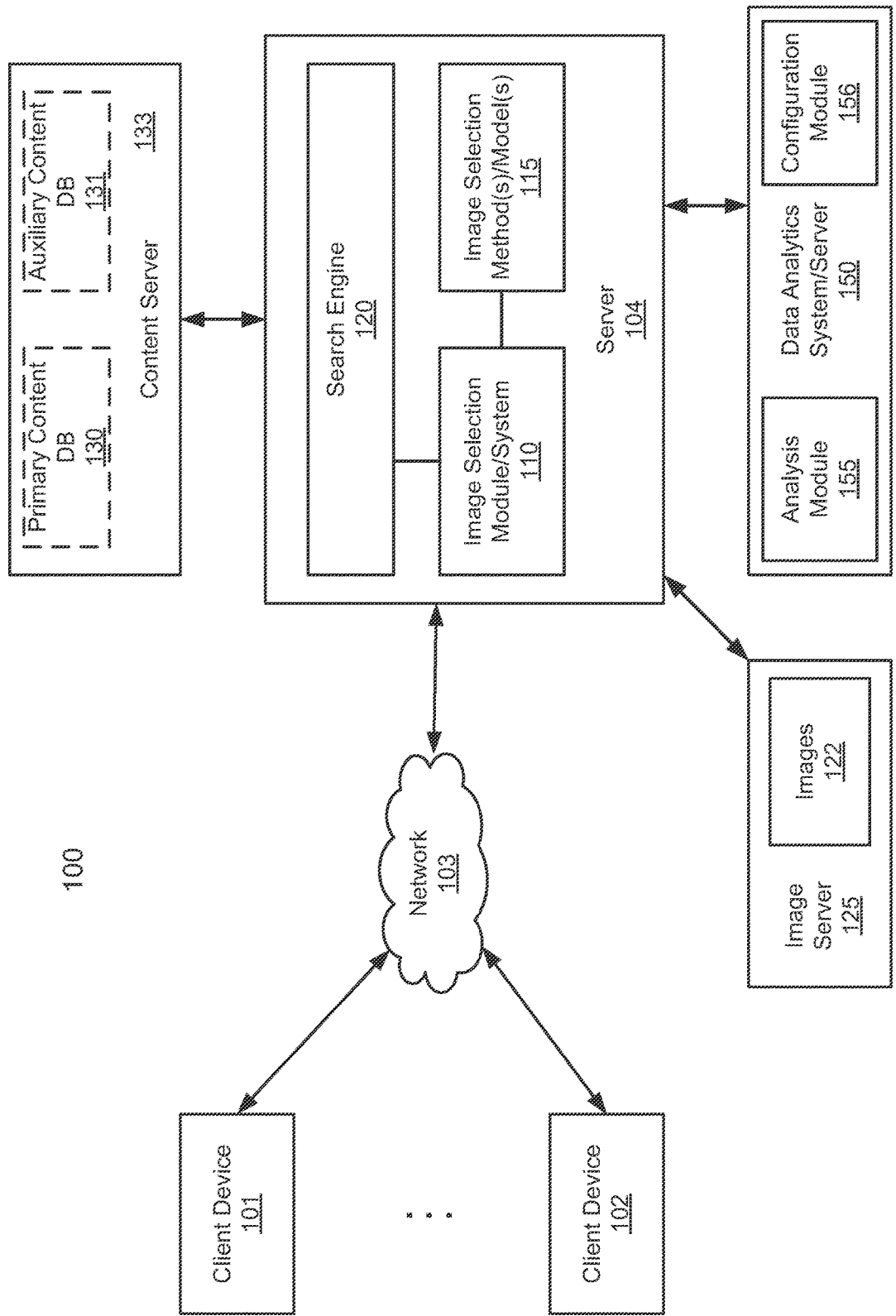

FIGS. 1A and 1B are block diagram illustrating an example of system configuration for matching images with content items according to some embodiments of the invention. Referring to FIG. 1A, system 100 includes, but is not limited to, one or more client devices 101-102 communicatively coupled to server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless.

Server 104 may be any kind of servers or a cluster of servers, such as Web or cloud servers, application servers, backend servers, or a combination thereof. In one embodiment, server 104 includes, but is not limited to, search engine 120, image selection module 110, and image selection method(s) or model(s) 115. Server 104 further includes an interface (not shown) to allow a client such as client devices 101-102 to access resources or services provided by server 104. The interface may include a Web interface, an application programming interface (API), and/or a command line interface (CLI).

For example, a client, in this example, a user application of client device 101 (e.g., Web browser, mobile application), may send a search query to server 104 and the search query is received by search engine 120 via the interface over network 103. In response to the search query, search engine 120 extracts one or more keywords (also referred to as search terms) from the search query. Search engine 120 performs a search in content database 133, which may include primary content database 130 and/or auxiliary content database 131, to identify a list of content items that are related to the keywords. Primary content database 130 (also referred to as a master content database) may be a general content database, while auxiliary content database 131 (also referred to as a secondary or accessory content database) may be a special content database. Search engine 120 returns a search result page having at least some of the content items in the list to client device 101 to be presented therein. Search engine 120 may be a Baidu® search engine available from Baidu, Inc. or alternatively, search engine 120 may represent a Google® search engine, a Microsoft Bing™ search engine, a Yahoo® search engine, or some other search engines.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. The search engine looks for the words or phrases exactly as entered. Some search engines provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

Referring back to FIG. 1A, according to one embodiment, in response to a search query received at server 104 from a client device, in this example, client device 101, search engine 120 performs a search in content database 133, such as primary content database 130 and/or auxiliary content database 131, to generate a list of content items. Each of the content items may be associated with a particular Web page of a particular Web site of a particular content provider via a uniform resource link (URL) and/or a uniform resource identifier (URI). In one embodiment, primary content database 130 stores general content items that have been collected by network crawlers (e.g., unsponsored content). Auxiliary content database 135 stores specific or special content items that are associated with specific, known, or predetermined content providers (e.g., sponsored content). Alternatively, content database 133 may be implemented as a single database without distinguishing primary content database 131 from auxiliary content database 132.

Network crawlers or Web crawlers are programs that automatically traverse the network's hypertext structure. In practice, the network crawlers may run on separate computers or servers, each of which is configured to execute one or more processes or threads that download documents from URLs. The network crawlers receive the assigned URLs and download the documents at those URLs. The network crawlers may also retrieve documents that are referenced by the retrieved documents to be processed by a content processing system (not shown) and/or search engine 120. Network crawlers can use various protocols to download pages associated with URLs, such as hypertext transport protocol (HTTP) and file transfer protocol (FTP).

In addition, according to one embodiment, image selection module or system 110 identifies based on the keywords associated with the search query or other parameters (e.g., content, content provider, locality, etc.), using image selection method(s) or model(s) 115, a list of image IDs identifying images that are related to the keywords associated with a search query. Image selection methods/models 115 may include a keyword-to-image (keyword/image) mapping table (not shown), which may be implemented in a variety of data structures such as a table or database. Based on the image IDs, a list of image candidates can be identified and retrieved from images 123 stored in image store 125, where image store 125 may also store image metadata describing images 122 (not shown).

In one embodiment, images 122 and their respective metadata may be obtained by one or more image or network crawlers that are designed to craw the networks to collect images as well as their surrounding metadata. Images 122 may be non-privileged, non-copyrightable, properly licensed images, or any other authorized images. The image candidates may be ranked based on a ranking algorithm or model. For each of the content items found in content database 133, an image is selected from the list of image candidates to be associated with the content item. The selected image may be incorporated with the content item to generate an incorporated or composite content item. For example, the selected image may serve as a background image to the content item. The list of incorporated content items and images is returned to client device 101 as part of a search result.

According to one embodiment, image selection methods/models 115 may be previously configured and generated prior to receiving the search query (e.g., offline), which may include a keyword-to-image (keyword/image) mapping table or index table. The keyword/image mapping table includes a number of mapping entries, each mapping entry mapping a keyword to one or more image IDs, or vice versa, as shown in FIGS. 3A-3E for example. The keywords may be identified as the keywords that are more likely used in search queries and/or keywords associated with certain content items (e.g., bidwords of sponsored content). A keyword may be extracted from a search query. A keyword may identify a particular content item such as a content ID. A keyword may identify a content provider that provides a content item. A keyword may identify a locality associated with a content distribution of a content item or a content provider. A keyword may identify a specific campaign, goal/purpose, subject matter, scheme, or time period associated with a content distribution plan of certain content items provided by a content provider. Other types of keywords may also be applicable. Such keywords may be identified based on an analysis or tracking of user searching activities or search history, which may be compiled for a period of time.

Subsequently when a search query is received at run-time by search engine 120 from a client device for searching content, a search is performed in content database 133 to retrieve a list of content items. In addition, an analysis is performed, for example, by image selection module 110, on the search query to determine one or more keywords associated with the search query. The determined keywords may be the keywords included in the search query. The determined keywords may further include certain keywords that are semantically similar or have the same meaning of the keywords originally in the search query (e.g., synonymous words or phrases). Based on the keywords, a list of one or more images are identified from image store 125 using the keyword/image mapping table as part of image selection methods/models 115.

In one embodiment, image selection methods or models 115 include a number of image searching methods that have been configured by data analytics system 150 based on user interaction history of prior search results. The image searching methods may include, but are not limited, a query-based searching method, a content-based searching method, a content provider-based searching method, a content distribution plan based searching method (e.g., campaign-based method), a locality-based searching method, and/or other types of searching methods.

The image searching methods may be prioritized according to a priority order determined based on the analysis of the prior user interactions of prior search results, for example, by analysis module 155. The image searching methods may be configured in a priority list and utilized according to the priority order specified within the priority list. The priority list may be specified in a configuration file stored in a persistent storage device. The configuration file may be configured offline, for example, by configuration module 156 based on the analysis and loaded into a system memory of server 104 at runtime.

According to one embodiment, the identified images may be ranked by image selection module 110, using a variety of ranking algorithms or ranking models as part of image selection methods/models 115, which have been generated and configured by data analytics system 150 (also referred to as a query/image mapping system). One of the images is then selected to be matched with the content item.

Note that the configuration of server 104 has been described for the purpose of illustration only. Server 104 may be a Web server to provide a frontend search service to a variety of end user devices. Alternatively server 104 may be an application server or backend server that provides specific or special content search services to a frontend server (e.g., Web server or a general content server), and to match and/or integrate images with content items of a content database or server. Data analytics system 150 may also be implemented as a separate server, which is responsible for creating or training image selection methods/models 115 based on the content items and their respective associated keywords of content database or server 133.

Other architectures or configurations may also be applicable. For example, as shown in FIG. 1B, content database 133 may be maintained and hosted in a separate server as a content server over a network. Similarly, image store 125 may be maintained and hosted in a separate server as an image server having an image searching engine therein. Servers 133 and 125 may be Web servers, application servers, or backend servers. Content server 133 and/or image server 125 may be organized and provided by the same entity or organization as of server 104. Alternatively, content server 133 and/or image server 125 may be maintained or hosted by separate entities or organizations (e.g., third-party providers), which are responsible for collecting contents in content databases 130-131 and images 122 and their metadata.

Also note that content database/server 133 may include primary content database 130 and auxiliary content database 131. Primary content database 130 may also be implemented or maintained in a separate content server, referred to as a primary content server. Similarly, auxiliary content database 131 may be implemented or maintained in a separate content sever, referred to as an auxiliary or accessory content server. The content items obtained from both content databases 130-131 may be matched with images obtained from image store/server 125 using a variety of matching formulas. Alternatively, only content items obtained from one of primary content database 130 and auxiliary content database 131 will be matched with images obtained from image store/server 125. For example, content items obtained from auxiliary content database 131 (e.g., sponsored content) will be matched with the images obtained from image store/server 125, while content items obtained from primary content database 130 (e.g., general content) will be returned to the client device without modification as part of the search result.

Figure 2:
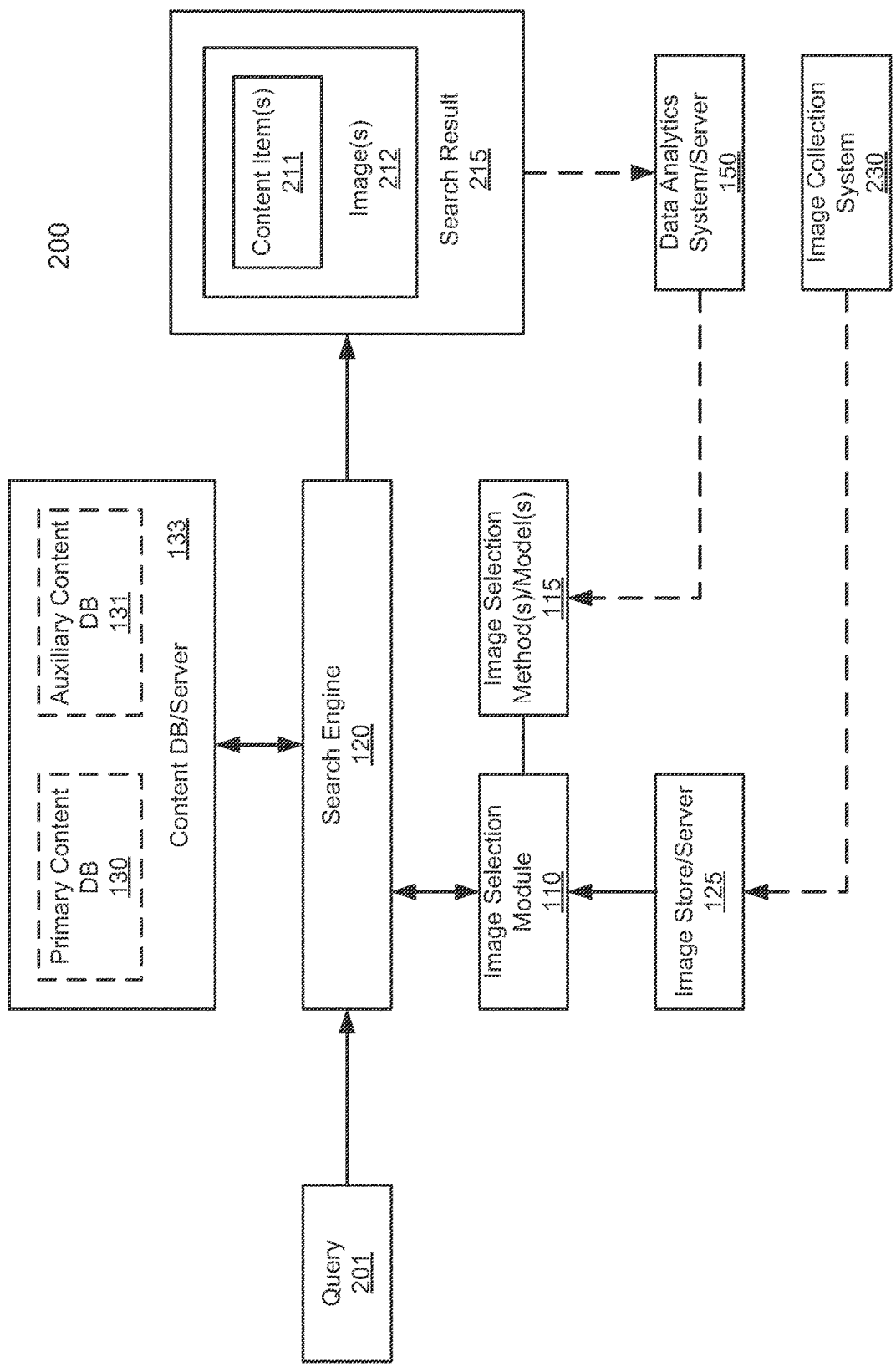
FIG. 2 is a block diagram illustrating an example of an image selection system according to one embodiment of the invention.

FIG. 2 is a block diagram illustrating a system for matching images with content items according to one embodiment of the invention. System 200 may be implemented as part of system 100 of FIGS. 1A-1B. Referring to FIG. 2, when search query 201 is received from a client device (e.g., client device 101 of FIG. 1), search engine 120 performs a search in content database or content server 133 to identify and retrieve a list of content items based on one or more keywords or search terms associated with search query 201. In addition, search engine 120 communicates with image selection module 110 to identify a list of images from image store or image sever using a set of image selection methods/models 115 according to the priority of the image searching methods.

In one embodiment, image selection module 110 and/or image selection methods/models 115 may be integrated with search engine 120. Image selection methods/models 115 may be previously configured or compiled, for example, by query/image mapping system 150. Query/image mapping system 150 may be hosted in a separate system or server communicatively coupled to system 200 via an API or over a network. Query/image mapping system 200 may include a user interface to allow a user or an administrator to configure a set of image selection methods/models 115.

Similarly, images stored in image store/server 125 may be collected by image collection system 230, which may be a separate system or server communicatively coupled to system 200 over a network. Query/image mapping system 150 and/or image collection system 230 may be operated by the same or different entity or organization as of system 200. In this example, images may be cached and stored in a local image store with respect to system 200 (e.g., local to server 104). Alternatively, images may be maintained by a designated server associated with image collection system 230, with which image selection module 110 communicates to identify and retrieve the list of images via API.

Based on the list of images retrieved from image store/server 125, image selection module 110 ranks the images according to a ranking algorithm. Some of the images are then matched with some of the content items identified and retrieved from content database/server 133. The matched content items and images are then integrated into integrated content items. In one embodiment, an image may be selected as a background image or a complementary image to a content item. For example, content item 211 may be a description or text and image 212 may be selected to be a background image for content item 211. Image 212 is selected based on the matching or ranking algorithms to complement or describe content item 211, or vice versa, in an appropriate manner. For example, the content of content item 211 is related to the content as shown in image 212, or vice versa. The integrated images 212 and content items 211 may be returned to the client device as a part of search result 215.

According to one embodiment, in response to search query 201 received from a client device, one or more keywords are determined based on search query 201, where the keywords may include those in search query 201 or those expanded based on an analysis on search query 201. Based on the keywords, search engine 120 performs a search in content database 133 to identify a list of one or more content items, which may be general content items from primary content database 130 and/or special content items from auxiliary content database 131 (e.g., sponsored content, Ads). In addition, image selection module 110 performs a search in image store or server 125 to identify a list of images using a variety of image searching methods as part of image selection methods or models 115.

Image selection methods/models 115 may include a query-based method, a content-based method, a content provider based method, content distribution based method, and/or locality-based method, etc. A list of one or more image IDs may be obtained based on image selection methods/models 115. Based on the image IDs, the corresponding images are obtained from image store/server 125 as image candidates. The image candidates are then ranked and matched using one or more predetermined ranking and/or matching algorithms, which will be described in details further below. The top ranked images may then be selected to be associated with the content items for integration as part of search result 215. Note that some or all of the components or modules as shown in FIG. 2 may be implemented in software, hardware, or a combination thereof.

FIGS. 3A-3E are examples of various index tables for searching images according to certain embodiments of the invention. The index tables as shown in FIGS. 3A-3E may be implemented as part of image searching methods 115. Referring to FIG. 3A, index table 300 may represent a query/image mapping table as part of query-based image searching method. In one embodiment, query/image matching table 300 includes a number of matching entries. Each of the matching entry maps one or more keywords 301 to one or more image IDs 302, where image IDs 302 identify the corresponding images in an image store or image server, such as image store/sever 125. Matching table 300 is indexed based on the keywords associated with queries. In this example, a first entry maps a term "flower" to images 1-5. A second entry maps a term "Beijing flower" to image 1 only. A third entry maps a term "Shanghai flow" to image 2. A fourth entry maps a term "flower delivery" to images 1-2 and 4. Thus, if a search query contains "Beijing flower," images 1-5 may be identified. However, image 1 may have a higher ranking.

FIG. 3B shows an example of an index table for content-based image searching, which includes a number of mapping entries, each entry mapping a content ID to one or more image IDs. When a content item is identified and retrieved from a content database, one or more image IDs can be obtained based on a content ID of the content item. In this embodiment, images can be identified for a particular content item.

FIG. 3C shows an example of an index table for content provider based image searching, which includes a number of mapping entries, each entry mapping a content provider ID to one or more image IDs. When a content item is identified and retrieved from a content database, one or more image IDs can be obtained based on a content provider ID of a content provider that provides the corresponding content item.

FIG. 3D shows an example of an index table for searching images based on a content distribution plan. The index table as shown in FIG. 3D includes a number of mapping entries, each entry mapping a content distribution plan ID to one or more image IDs. A content distribution plan ID identifies a particular content distribution plan or promotion plan (e.g., Ads campaign, a time period for distributing content). When a content item is identified and retrieved from a content database, one or more image IDs can be obtained based on a content distribution ID of a content distribution plan for distributing the corresponding content item.

FIG. 3E shows an example of an index table for searching images based on a content distribution locality. The index table as shown in FIG. 3E includes a number of mapping entries, each entry mapping a content distribution locality ID to one or more image IDs. A content distribution locality ID identifies a particular locality (e.g., geographical location) within which the content item is to be distributed. Note that the index tables as show in FIGS. 3A-3E can be accessed via a set of APIs (e.g., database protocols). The index tables can also be implemented in a variety of data structures.

Figure 4:
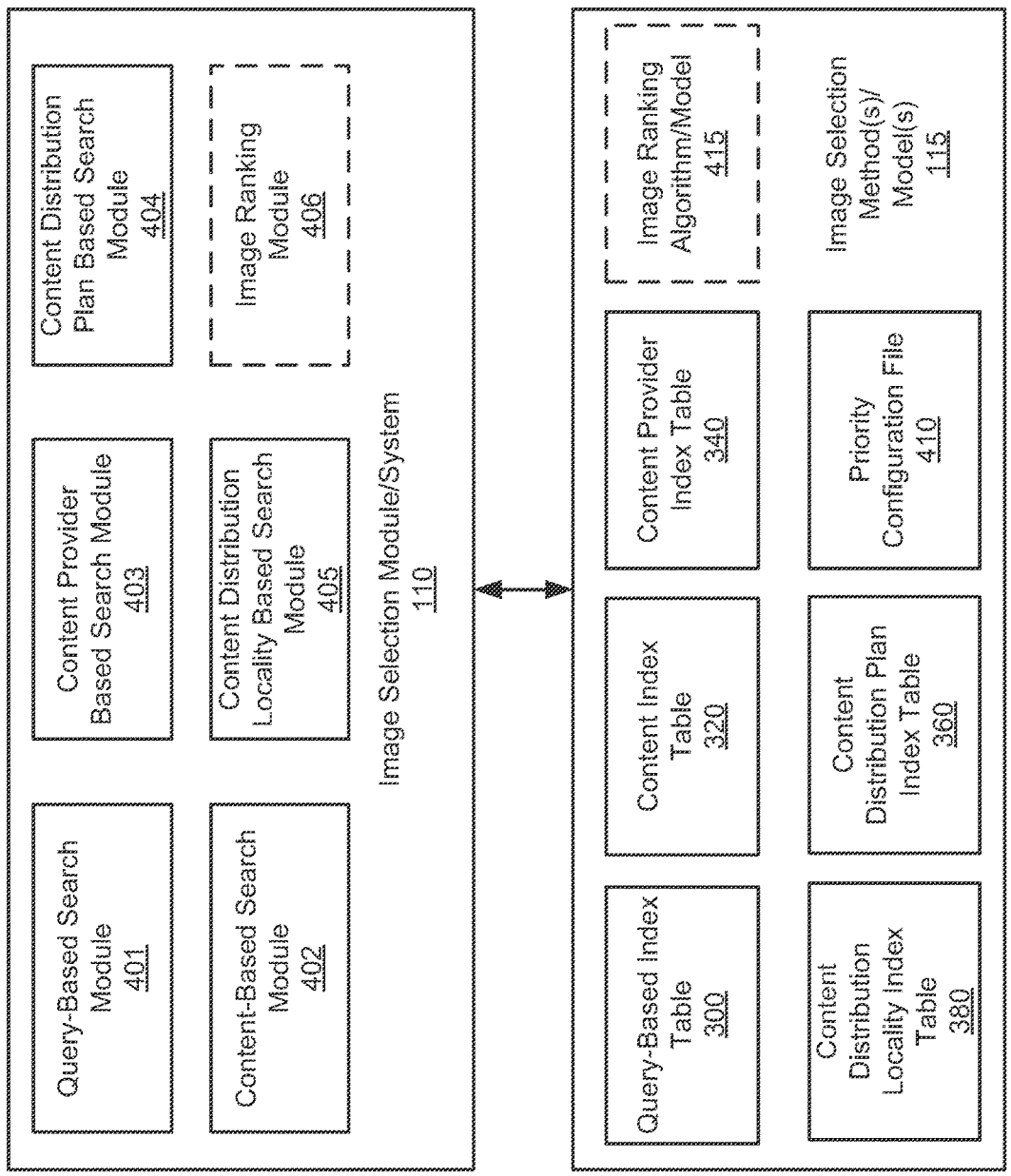
FIG. 4 is a block diagram illustrating an example of image selection system according one embodiment of the invention.

FIG. 4 is a block diagram illustrating an example of image selection system according one embodiment of the invention. System 400 may be implemented as part of system 100 or system 200 of FIGS. 1A-1B and 2. Referring to FIG. 4, image selection module or system 110 includes, but is not limited to, query based search module 401, content based search module 402, content provider based search module 403, content distribution plan based search module 404, content distribution locality based search module, and optional image ranking module 406. Note that modules 401-406 are shown for the purpose of illustration only. Modules 401-406 may be implemented in fewer modules or single module.

In one embodiment, query based search module 401 is to search images based on one or more keywords of a search query using a query based image searching method, in this example, query based index table 300. Content based search module 402 is to search images based on a content ID identifying a content item (e.g., advertisement) using a content based image searching method (e.g., content based index table 320). Content provider based search module 403 is to search images based on a content provider ID identifying a content provider (e.g., advertiser) that provides a content item (e.g., content provider based index table 340). Similarly, modules 404-405 are to search images based on a content distribution plan and content distribution locality associated with a particular content item using respective image searching methods respectively (e.g., content distribution plan index table 360 and content distribution locality index table 380). The image searching methods may be invoked based on a priority order of priority list as part of priority configuration file 410. Note that modules 401-406 may be implemented in software, hardware, or a combination thereof. For example, scoring modules 401-406 may be loaded in a memory and executed by one or more processors.

Figure 5:
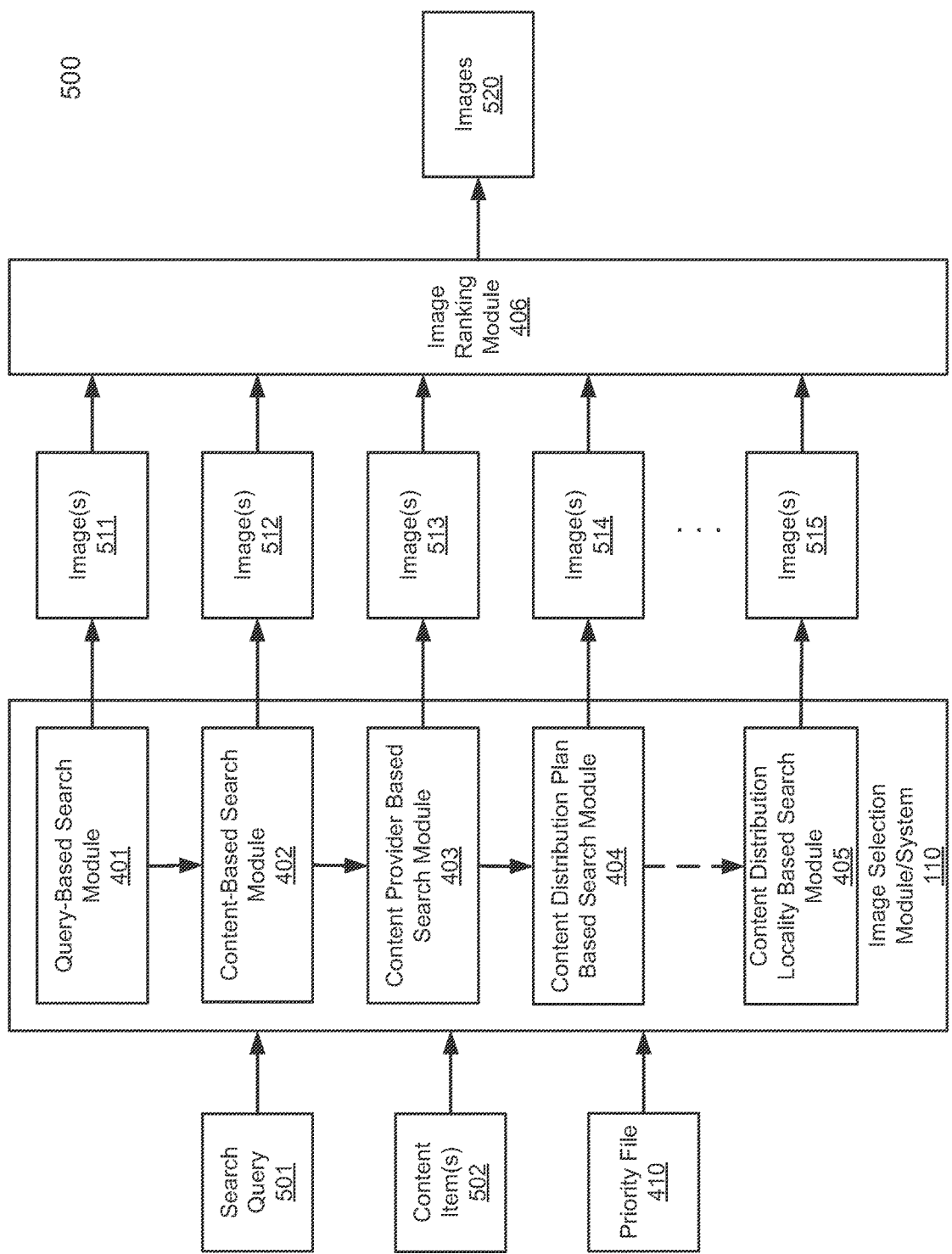
FIG. 5 is a processing flow diagram illustrating a process of searching images according to one embodiment of the invention.

FIG. 5 is a processing flow diagram illustrating a process of searching images according to one embodiment of the invention. Referring to FIGS. 4-5, in response to search query 501, a search engine (e.g., search engine 120) searches and identifies a list of content items 502 (e.g., sponsored content items such as Ads) from a content database or content server. Based on search query 501 and content items 502, at least one of image searching modules 401-405 of image selection module or system 110 is invoked to search and identify a list of one or more images to be associated with content items 502, using a corresponding image searching method or model.

In one embodiment, the image searching methods may be prioritized according to a priority order specified in a priority list stored priority configuration file 410. An example of a priority of configuration file 410 is shown in FIG. 6. The priority order may be determined and configured based on prior user interactions or matching quality of images and content, such as, for example, a click through rate or a recall rate. A click through rate (CTR) is the ratio of users who click on a specific link or content item to the number of total users who view a page, email, or content item. It is commonly used to measure the success of an online content distribution campaign for a particular website as well as the effectiveness of email campaigns.

The purpose of click-through rates is to measure the ratio of clicks to impressions of an online ad or email marketing campaign. Generally the higher the CTR the more effective the marketing campaign has been at bringing people to a website. Most commercial websites are designed to elicit some sort of action, whether it be to buy a book, read a news article, watch a music video, or search for a flight. People rarely visit websites with the intention of viewing advertisements, in the same way that few people watch television to view the commercials.

While marketers want to know the reaction of the web visitor, with current technology it is nearly impossible to quantify the emotional reaction to the site and the effect of that site on the firm's brand. However, click-through rate is an easy piece of data to acquire. The click-through rate measures the proportion of visitors who initiated an advertisement that redirected them to another page where they might purchase an item or learn more about a product or service.

Referring back to FIG. 5, in one embodiment, the image searching methods may be selected according to the priority order, one at a time, to search images using a corresponding image searching method. If the images returned from the search do not satisfy the content items, a second in line image search searching method is selected and used to search additional images using a corresponding image searching method, until all of the content items have been associated with images or all of the image searching methods have been exhausted. The goal is to find an image to be associated with each of the content items 502 that are identified in response to search query 501.

In this example, the priority order is from a query based search to a content distribution locality based search, as shown in FIG. 6. The image searches using different image searching methods may be performed in sequence or alternatively, they can be performed in parallel. The resulting images 511-515 may be optionally ranked by image ranking module 406 using a variety of ranking algorithms to generate final image candidates 520. Especially when there are more images than the number of content items 502. Higher ranked images can then be selected for matching with content items 502.

In one embodiment, an image searching method with the highest priority is selected to search images. If the images in return cannot satisfy all of the content items, a next image searching method in line is selected and utilized to search additional images, and so on. The images in return using a particular image searching method may or may not be suitable to be matched with a particular content item. As a result, another image searching method is utilized to search and provide additional images.

For example, in the example as shown in FIG. 5, a first image searching method is query-based searching method, which has the highest priority specified in the priority list 410. The images are identified based on one or more keywords of search query 501, for example, using query-based index table 300 of FIG. 3A. The images in return are then utilized to match with content items 502. Some of the content items 502 may not match with the images obtained using the query-based searching method. For example, an image may include content (e.g., recognized by an image recognition process) that contradicts or has conflict with the content represented by a particular content item. For example, an image may include a logo of a particular entity that is a competitor of a content provider of a particular content item. An image may be specifically associated or owned by a content provider that is not the same content provider of a particular content item.

As a result, some of the content items 502 may not be associated with any of the images obtained using the first image searching method. For those content items, a second image searching method is utilized, in this example as shown in FIG. 5, a content-based image searching method. For example, for each of the content items that have not been matched using the first image searching method (e.g., query-based searching method), a second search is performed based on a content ID of the content item using a content-based image searching method (e.g., content based index table 320 of FIG. 3B), and so on, until all of the content items have been assigned with an image or all of the image searching methods have been exhausted.

According to one embodiment, the images may be ranked using a variety of ranking algorithms or ranking models. For each of the images that are identified as image candidates to be matched with a content item, a feature score is calculated for each of the features (e.g., image attributes or properties, and/or any other metadata or circumstantial data surrounding the image) that are extracted or determined from the image. Each feature may be calculated using a specific feature score algorithm that has been trained or configured based on features of a large amount of images utilized to match content items in response to a large amount of search queries in the past. In addition, a matching type score between the image and the content item is determined based on metadata of the image, the search query, and the content item. A matching type score may be different dependent upon a matching type between a search query and an image that is identified based on the search query (e.g., matching keywords between the search query and the image). A matching type can an exact match, a partial match, or a broad match (e.g., semantic match), each being associated with a specific matching type score.

A matching quality score is then calculated based on at least some of the feature scores of the features and the matching type score is calculated. The features associated with an image may include a variety of metadata, such as, for example, image attributes or properties (e.g., resolution, brightness, contrast, orientation, size, source of the image, content represented by the image). A matching quality score may be calculated using a predetermined algorithm based on the matching type score and the feature scores. Alternatively, a matching quality score may be determined by applying the matching type score and the feature scores to a ranking model that has been trained using historic image data, query data, and user interactive data. The matching quality score is then utilized as a ranking score to rank the corresponding image in view of the matching quality scores of other images. One of the images having a ranking score higher than a predetermined threshold may be selected to be matched with the content item, for example, as a background image with respect to the content item.

Figure 7:
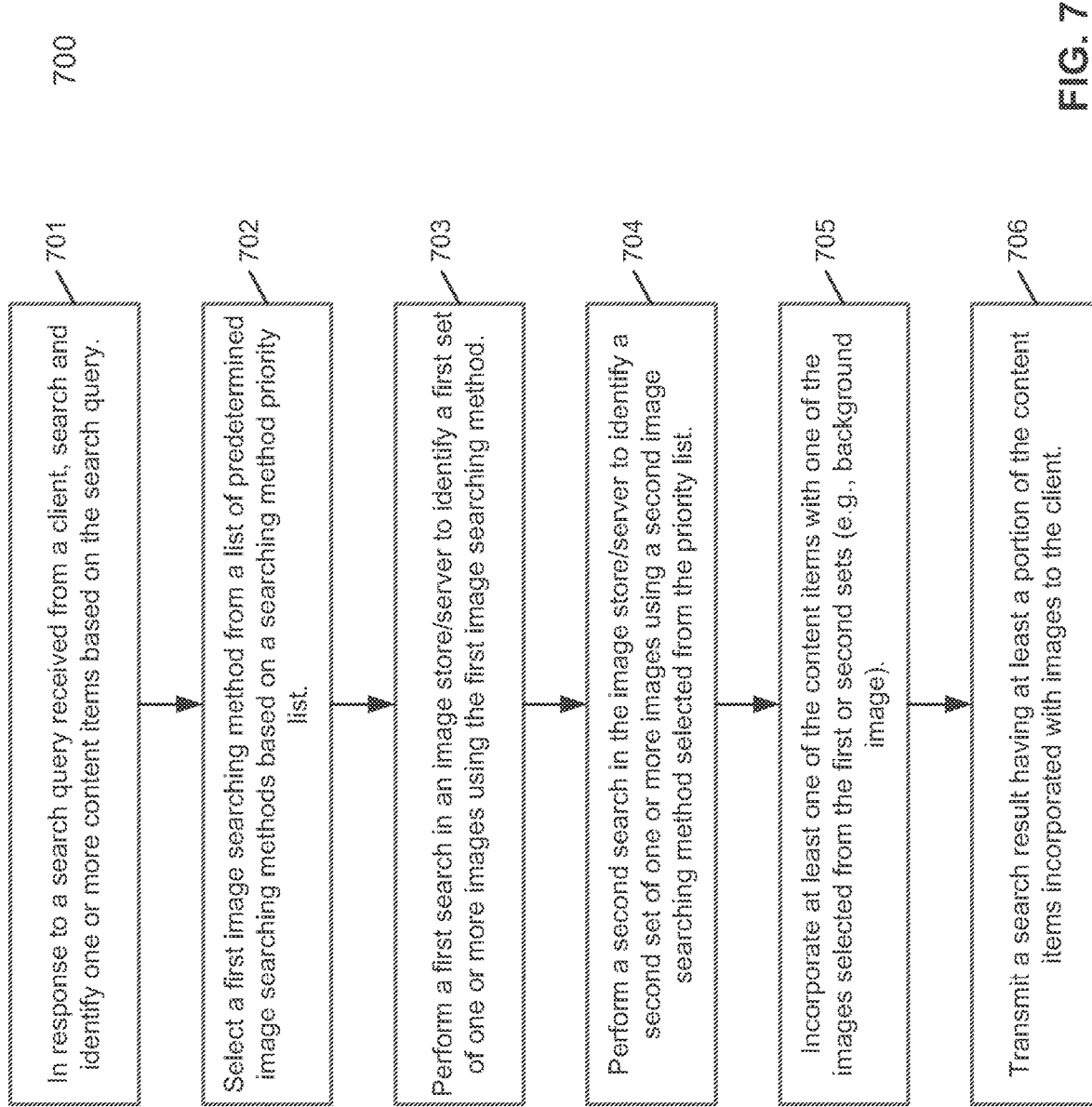
FIG. 7 is a flow diagram illustrating a process for matching images with content items according one embodiment of the invention.

FIG. 7 is a flow diagram illustrating a process for matching images with content items according one embodiment of the invention. Process 700 may be performed by processing logic which may include software, hardware, or a combination thereof. For example, process 700 may be performed by system 400 of FIG. 4. Referring to FIG. 7, in response to a search query received from a client at block 701, processing logic searches and identifies a list of one or more content items based on one or more keywords of the search query. At block 702, processing logic selects a first image searching method from a list of predetermined image searching methods based on a priority list of searching methods. At block 703, processing logic performs a search in an image store or image server to identify a first set of images.

At block 704, processing logic performs a second search in the image store or server to identify a second set of images using a second image searching method from the priority list. The first and second image searching methods are different and have different priorities. The first image searching method is associated with a first priority that is higher than a second priority associated with the second image searching method. In one embodiment, the second search is performed only if the first set of images cannot satisfy the content items. For example, a number of images in the first set is less than the number of content items. At block 705, processing logic associates each of the content items with one of the images selected from the first set or the second set of images, for example, by incorporating the content item with the image as a background image. At block 706, processing logic transmits a search result having at least a portion of the content items incorporated with one of the images to the client.

Figure 8:
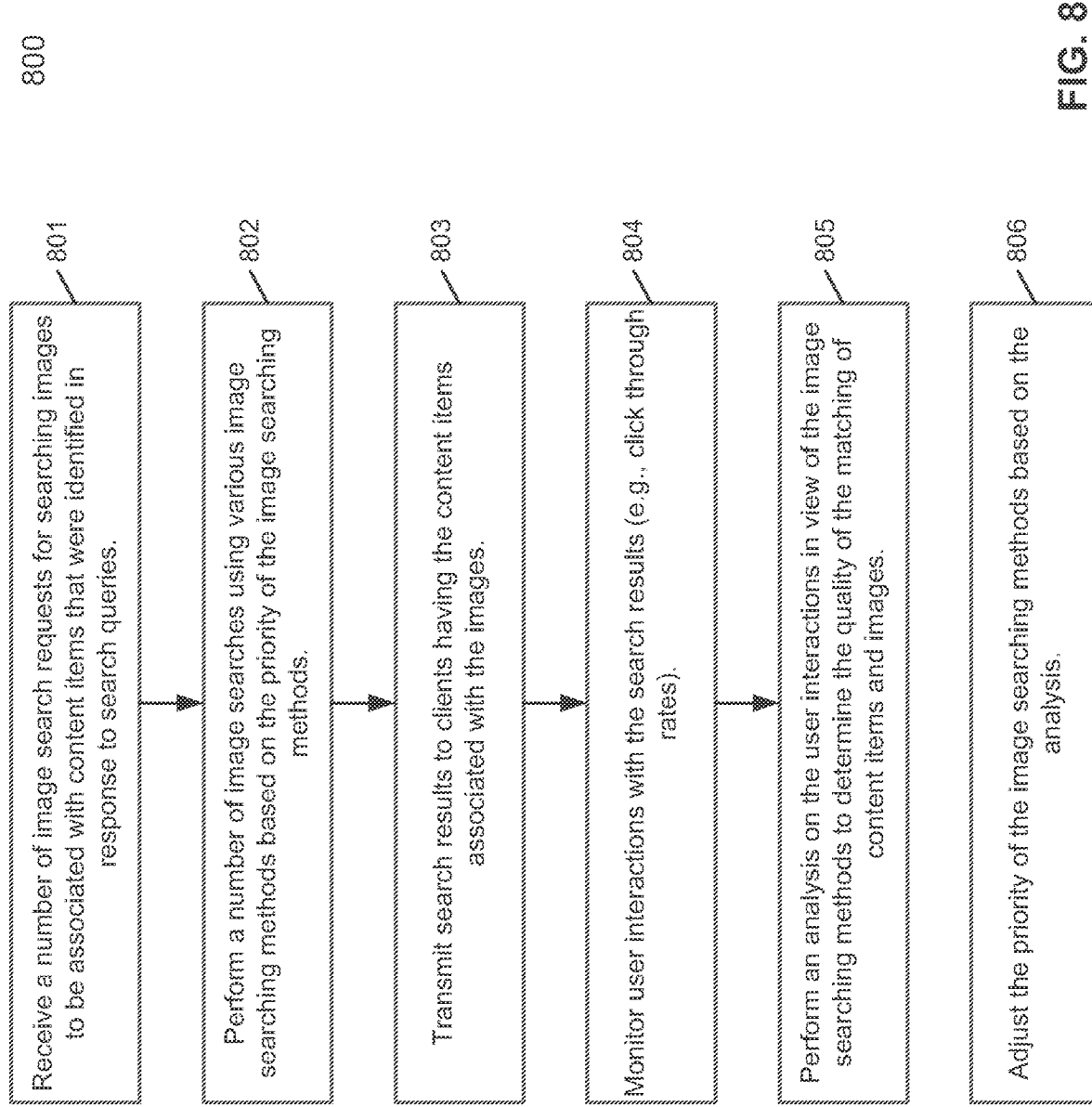
FIG. 8 is a flow diagram illustrating a process for evaluating matchings of content items and images according one embodiment of the invention.

FIG. 8 is a flow diagram illustrating a process for evaluating matchings of content items and images according to one embodiment of the invention. Process 800 may be performed by processing logic which may include software, hardware, or a combination thereof. For example, process 800 may be performed by system 150 of FIGS. 1A-1B. Referring to FIG. 8, at block 801, processing logic receives a number of image search requests for searching images to be associated with a number of content items. The content items were identified in response to a search query. At block 802, processing logic performs a number of image searches in an image store using different image searching methods. At block 803, search results are generated and transmitted to clients. Each search result includes at least some of the content items and some of them are incorporated with the images (e.g., as background images). At block 804, user interactions with the content items of the search results (e.g., click events) are monitored and captured. At block 805, processing logic performs an analysis on the user interactions in view of the corresponding image search methods to determine the matching quality of content items and images. At block 806, processing logic adjusts the priority order of a priority list listing the image searching methods therein. The priority list is utilized in subsequent online image searches.

The techniques described above can be applied to matching images with sponsored content. One type of the sponsored content is advertisement (Ads). For example, referring back to FIGS. 1A-1B, content database (DB) or server 133 may be an Ads database or Ads server. Each of the content items, e.g., Ads, is associated with a list of predefined keywords, terms, phrases, or sentences. These predefined keywords, terms, phrases, or sentences may be bidwords purchased, defined or specified by an Ads provider. In another embodiment, primary content DB 130 may store the general content generally available in a public network. Auxiliary content DB 131 may be an Ads DB. Some of the Ads may be just plain texts. By matching and integrating an image with the Ads, for example, as a background image, the Ads may be more appealing or attractive to users. Server 104 may be a Web server for searching content or alternatively, server 104 may be an Ads server.

Figure 9:
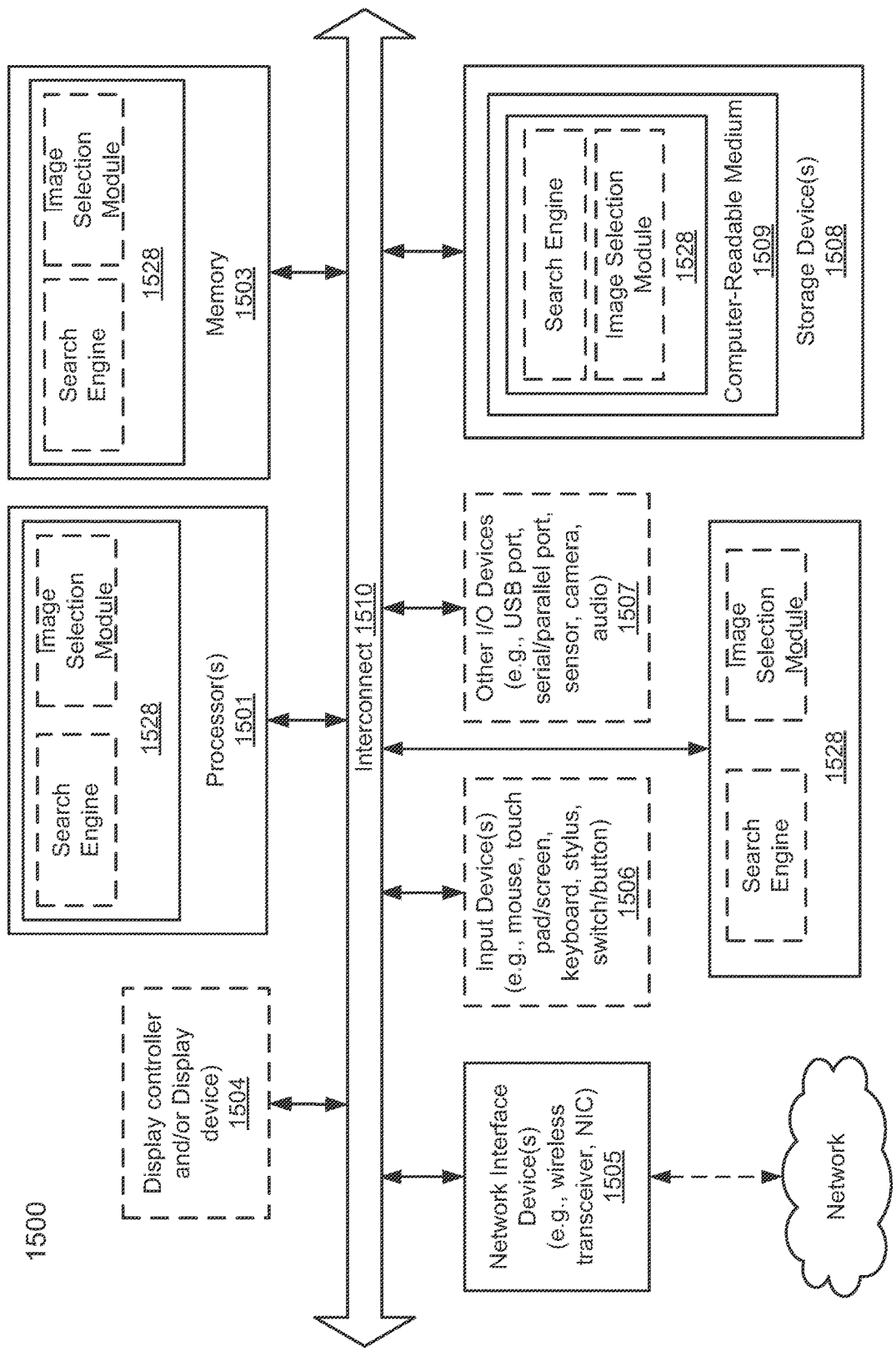
FIG. 9 is a block diagram illustrating a data processing system according to one embodiment.

FIG. 9 is a block diagram illustrating an example of a data processing system which may be used with one embodiment of the invention. For example, system 1500 may represents any of data processing systems described above performing any of the processes or methods described above, such as, for example, a client device or a server described above, such as, for example, client devices 101-102, server 104, content server 133, analytics system/server 150, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for matching images with content items, the method comprising:
   in response to a search query received from a client, searching in a content database to identify a list of one or more content items based on one or more keywords of the search query;
   selecting a first image searching method from an image searching method priority list, wherein each image searching method in the image searching method priority list uses a different searching algorithm, and wherein the first image searching method has a highest priority in execution in the image searching method priority list;
   performing a first search in an image store using the first image searching method to identify a first set of one or more images;
   determining whether a number of images in the first set of one or more images is smaller than a number of content items in the list of one or more content items;
   performing a second search in the image store using a second image searching method with a second highest priority to identify a second set of one or more images, in response to determining that the number of images in the first set of one more images is smaller than the number of content items;
   in response to determining that a total number of images in the first set of images and second set of images is smaller than the number of content items, performing one or more additional searches using one of more image searching methods in image searching method priority list, one at a time and in order of priority, to retrieve additional images from the image store until the image searching methods in the image searching method priority list are exhausted, or a number of images in the first set of images, the second set of images and the additional images combined are equal to or exceeds the number of content items, and
   transmitting a search result having at least a portion of the content items to the client, each content item being associated with one of the images selected from the first set of images, the second set of images and the additional images.

2. The method of claim 1, wherein the searching method priority list describes a plurality of image searching methods according to a priority order specified in the image searching priority list.

3. The method of claim 2, wherein the plurality of image searching methods comprises:
   a first image searching method to search images based on a search query;
   a second image searching method to search images based on a content identifier (ID) identifying a content item; and
   a third image searching method to search images based on a content provider ID identifying a content provider that provides a content item.

4. The method of claim 3, wherein the plurality of image searching methods further comprises:
   a fourth image searching method to search images based on a content plan ID identifying a content distribution plan associated with a content item; and
   a fifth image searching method to search images based on a content locale ID identifying a locale within which a content item is distributed.

5. The method of claim 2, wherein the priority order of the image searching methods in the priority list was determined based on prior user interactions with respect to a plurality of prior search results, and wherein the prior search results include content items matched with images that were identified using different ones of the image searching methods.

6. The method of claim 5, wherein the prior user interactions comprise a click rate or a recall rate of the content items matched with the images in the prior search results.

7. A non-transitory machine-readable medium having instructions stored therein, which when executed by a processor, cause the processor to perform operations of matching content items with images, the operations comprising:
   in response to a search query received from a client, searching in a content database to identify a list of one or more content items based on one or more keywords of the search query;
   selecting a first image searching method from an image searching method priority list, wherein each image searching method in the image searching method priority list uses a different searching algorithm, and wherein the first image searching method has a highest priority in execution in the image searching method priority list;
   performing a first search in an image store using the first image searching method to identify a first set of one or more images;
   determining whether a number of images in the first set of one or more images is smaller than a number of content items in the list of one or more content items;
   performing a second search in the image store using a second image searching method with second highest priority to identify a second set of one or more images, in response to determining that the number of images in the first set of one or more images is smaller than the number of content items;
   in response to determining that a total number of images in the first set of images and the second set of images is smaller than the number of content items, performing one or more additional searches using one of more image searching methods in image searching method priority list, one at a time and in order of priority to retrieve additional images from the image store until the image searching methods in the image searching method priority list are exhausted, or a number of images in the first set images, the second set of images and the additional images combined are equal to or exceeds the number of content images, and
   transmitting a search result having at least a portion of the content items to the client, each content item being associated with one of the images selected from the first set of images, the second set of images and the additional images.

8. The machine-readable medium of claim 7, wherein the searching method priority list describes a plurality of image searching methods according to a priority order specified in the searching method priority list.

9. The machine-readable medium of claim 8, wherein the plurality of image searching methods comprises:
   a first image searching method to search images based on a search query;
   a second image searching method to search images based on a content identifier (ID) identifying a content item; and
   a third image searching method to search images based on a content provider ID identifying a content provider that provides a content item.

10. The machine-readable medium of claim 9, wherein the plurality of image searching methods further comprises:

a fourth image searching method to search images based on a content plan ID identifying a content distribution plan associated with a content item; and a fifth image searching method to search images based on a content locale ID identifying a locale within which a content item is distributed.

11. The machine-readable medium of claim 8, wherein the priority order of the image searching methods in the priority list was determined based on prior user interactions with respect to a plurality of prior search results, and wherein the prior search results include content items matched with images that were identified using different ones of the image searching methods.

12. The machine-readable medium of claim 11, wherein the prior user interactions comprise a click rate or a recall rate of the content items matched with the images in the prior search results.

13. A data processing system, comprising:
a processor; and
a memory coupled to the processor to store instructions, which when executed by the processor, cause the processor to perform operations of matching content with images, the operations including
in response to a search query received from a client, searching in a content database to identify a list of one or more content items based on one or more keywords of the search query,
selecting a first image searching method from an image searching method priority list, wherein each image searching method in the image searching method priority list uses a different searching algorithm, and wherein the first image searching method has a highest priority in execution in the image searching method priority list;
performing a first search in an image store using the first image searching method to identify a first set of one or more images,
determining whether a number of images in the first set of one or more images is smaller than a number of content items in the list of one or more content items,
performing a second search in the image store using a second image searching method with a second highest priority to identify a second set of one or more images, in response to determining that the number of images in the first set of one or more images is smaller than the number of content items,
in response to determining that a total number of images in the first set of images and the second set of images is smaller than the number of content items performing one of more additional searches using one or more images searching methods in image searching method priority list, one at a time and in order of priority to retrieve additional images from the image store until the image searching methods in the image searching methods priority list are exhausted, or a number of images in the first set of images, the second set of images and the additional images combined are equal to or exceeds the number of content items, and
transmitting a search result having at least a portion of the content items to the client, each content item being associated with one of the images selected from the first set of images, the second set of images and the additional images.

14. The system of claim 13, wherein the searching method priority list describes a plurality of image searching methods according to a priority order specified in the image searching priority list.

15. The system of claim 14, wherein the plurality of image searching methods comprises:
a first image searching method to search images based on a search query;
a second image searching method to search images based on a content identifier (ID) identifying a content item; and
a third image searching method to search images based on a content provider ID identifying a content provider that provides a content item.

16. The system of claim 15, wherein the plurality of image searching methods further comprises:
a fourth image searching method to search images based on a content plan ID identifying a content distribution plan associated with a content item; and
a fifth image searching method to search images based on a content locale ID identifying a locale within which a content item is distributed.

17. The system of claim 14, wherein the priority order of the image searching methods in the priority list was determined based on prior user interactions with respect to a plurality of prior search results, and wherein the prior search results include content items matched with images that were identified using different ones of the image searching methods.

18. The system of claim 17, wherein the prior user interactions comprise a click rate or a recall rate of the content items matched with the images in the prior search results.

* * * * *